United States Patent
Ma (10) Patent No.: US 12,425,198 B2
(45) Date of Patent: Sep. 23, 2025

(54) METHOD AND APPARATUS FOR SHARING ENCRYPTED DATA, DEVICE AND READABLE MEDIUM

(71) Applicant: SHANDONG YINGXIN COMPUTER TECHNOLOGIES CO., LTD., Shandong (CN)

(72) Inventor: Fuqiang Ma, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 93 days.

(21) Appl. No.: 18/265,329

(22) PCT Filed: Apr. 22, 2022

(86) PCT No.: PCT/CN2022/088569
§ 371 (c)(1),
(2) Date: Jun. 5, 2023

(87) PCT Pub. No.: WO2022/223036
PCT Pub. Date: Oct. 27, 2022

(65) Prior Publication Data
US 2024/0039709 A1      Feb. 1, 2024

(30) Foreign Application Priority Data
Apr. 23, 2021   (CN) .......................... 202110442814.0

(51) Int. Cl.
*H04L 9/08*   (2006.01)
*H04L 9/30*   (2006.01)
*H04L 9/32*   (2006.01)

(52) U.S. Cl.
CPC ............ *H04L 9/085* (2013.01); *H04L 9/0866* (2013.01); *H04L 9/0891* (2013.01); *H04L 9/30* (2013.01); *H04L 9/3213* (2013.01)

(58) Field of Classification Search
CPC ..... H04L 9/085; H04L 9/0866; H04L 9/0891; H04L 9/30; H04L 9/3213; H04L 9/0894;
(Continued)

(56) References Cited

U.S. PATENT DOCUMENTS

2023/0370248 A1*  11/2023  Imabayashi .......... H04L 9/0825

FOREIGN PATENT DOCUMENTS

| CN | 103647642 A | 3/2014 |
|---|---|---|
| CN | 104539610 A | 4/2015 |

(Continued)

*Primary Examiner* — J. Brant Murphy
(74) *Attorney, Agent, or Firm* — IPro, PLLC (57) ABSTRACT

Disclosed in the present application are a method and apparatus for sharing encrypted data, and a device and a readable medium. The method for sharing the encrypted data includes: receiving a data sharing request sent by a data owner, and generating a data owner public key and a data owner private key; generating a data user public key, and generating a proxy re-encryption key on the basis of the data user public key and the data owner private key; encrypting shared data on the basis of the data owner public key, and uploading the encrypted data to a data processing center; acquiring a corresponding proxy re-encryption key and corresponding encrypted data on the basis of the data sharing request, and re-encrypting the encrypted data on the basis of the proxy re-encryption key.

20 Claims, 4 Drawing Sheets

(58) Field of Classification Search
CPC ..... H04L 9/0825; H04L 9/0836; G06F 21/45; G06F 21/602; G06F 21/604; G06F 21/64; G06F 2221/2141
See application file for complete search history.

(56) References Cited

FOREIGN PATENT DOCUMENTS

| | | |
|---|---|---|
| CN | 106850656 A | 6/2017 |
| CN | 107637015 A | 1/2018 |
| CN | 109039614 A | 12/2018 |
| CN | 109347832 A | 2/2019 |
| CN | 112364376 A | 2/2021 |
| CN | 112532580 A | 3/2021 |
| CN | 113360886 A | 9/2021 |
| WO | 2019103360 A1 | 5/2019 |

* cited by examiner

METHOD AND APPARATUS FOR SHARING ENCRYPTED DATA, DEVICE AND READABLE MEDIUM

CROSS-REFERENCE TO RELATED APPLICATION

The present disclosure claims the priority of the Chinese patent application filed on Apr. 23, 2021 before the China National Intellectual Property Administration with the application number of 202110442814.0 and the title of "METHOD AND APPARATUS FOR SHARING ENCRYPTED DATA, DEVICE AND READABLE MEDIUM", which is incorporated herein in its entirety by reference.

FIELD

The present application relates to the technical field of sharing data and, more particularly, to a method and an apparatus for sharing encrypted data, a device and a readable medium.

BACKGROUND

With the development of cloud computing, users no longer directly control hardware resources of a cloud platform, but directly use the services in the cloud computing environment, that is, data and programs of the users run in the cloud computing environment. Users lose direct control to the cloud computing platform, resulting in the management authority of data in the cloud platform belonging to the service providers. Therefore, in the cloud computing environment, the security of the data and the programs of the users is becoming increasingly important.

Since the data storage and data processing services provided by the cloud service providers are not completely trustworthy, the cloud service providers may steal the private data of the users without the users' permission. In order to ensure the security of data transmission, data storage, user access and business operations in the cloud computing environment, the cryptographic technology, as the core technology to ensure the security of the cloud computing platform, plays an increasingly important role in the cloud computing environment. The key management system (KMS) related to the cryptographic technology is the foundation for ensuring the security of cloud computing platforms, providing services such as secure key hosting and cryptographic operations. Through the key management system, users may focus more on business functions such as data encryption and decryption, data transmission and electronic signatures in the cloud computing environment, without spending a lot of cost to ensure the security of their keys.

Therefore, data storage in the cloud computing platforms often uses the key of the key management system for encrypted storage. However, the data stored by the users in the cloud computing are not only used by themselves, sometimes need to be shared with others. How to safely and efficiently share files with other users without revealing one's private key has become a hot area for the cloud computing platforms.

In the existing proxy re-encryption system, the proxy server does not have functions such as storage, update, and destruction of the key. At present, the scheme sharing encrypted data based on the proxy re-encryption in the cloud computing system is located in a trusted third-party key generation center, which only has the function of generating keys, and does not have the functions of secure storage, update, destruction and execution of the keys, resulting in the risk of leakage of the keys during using.

In the existing cloud computing system, the key transmission between different services only adopts a secure sockets layer (SSL) transmission encryption, which cannot ensure the security of key transmission. Once the key leaves the key management system, the key is in an insecure state. If the key is leaked during using, the data protected by the key will be in an insecure state, and moreover, the key management system is likely to be in an attacked state.

The existing cloud computing platforms provides identity authentication and access control services, computing services, storage services, network services and key management system services. At present, the key management system only supports generation, storage, update, destruction, simple encryption and decryption operations, etc. of the key, and does not have the support for the proxy re-encryption function.

SUMMARY

In a first aspect, a method for sharing encrypted data is provided in the embodiments of the present disclosure, including: receiving a data sharing request sent by a data owner, and generating a data owner public key and a data owner private key according to an identity identifier of the data owner in the data sharing request; generating a data user public key according to an identity identifier of a data user in the data sharing request, and generating a proxy re-encryption key based on the data user public key and the data owner private key; encrypting shared data based on the data owner public key, and uploading encrypted data to a data processing center for storing; in response to receiving a request for obtaining shared data from the data user, obtaining a corresponding proxy re-encryption key and corresponding encrypted data based on the request for obtaining shared data, and re-encrypting the encrypted data based on the proxy re-encryption key to obtain re-encrypted data; and obtaining a data user private key of the data user and decrypting the re-encrypted data based on the data user private key to obtain the shared data.

In some embodiments, the method for sharing the encrypted data further includes executing steps in a key management system, the steps include: encrypting or decrypting at least one user key based on an item key, the user key including a data owner key and/or a data user key; encrypting or decrypting at least one proxy re-encryption key based on a shared item key; encrypting or decrypting at least one proxy master key and at least one corresponding proxy public parameter based on a parameter key; and encrypting or decrypting all of the item keys, all of the shared item keys and all of the parameter keys based on a system master key.

In some embodiments, receiving the data sharing request sent by the data owner includes: receiving a login request of the data owner by a cloud computing system and performing identity authentication to the data owner based on the login request; in responding that identity authentication of the data owner passes, allocating an authorization token to the data owner; and receiving the data sharing request of the data owner by the key management system.

In some embodiments, generating the data owner public key and the data owner private key according to the identity identifier of the data owner in the data sharing request includes: determining whether the data owner creates a corresponding item key, in response to that the data owner does not create the corresponding item key, creating the corresponding item key; determining whether the data owner creates a corresponding parameter key, in response to that the data owner does not create the corresponding parameter key, and creating the corresponding parameter key; determining whether the data owner creates a corresponding proxy master key and a corresponding proxy public parameter, in response to that the data owner does not create the corresponding proxy master key and the corresponding proxy public parameter, and creating the corresponding proxy master key and the corresponding proxy public parameter; creating the data owner public key based on the identity identifier of the data owner, and generating the data owner private key based on the data owner public key, the corresponding proxy master key and the corresponding proxy parameter; encrypting the data owner public key and the data owner private key based on the item key and storing in the key management system; encrypting the corresponding proxy master key and the corresponding proxy public parameter based on the parameter key, and storing in the key management system; and storing the system master key by the key management system, and encrypting the item key, the shared item key and the parameter key based on the system master key, and storing in the key management system.

In some embodiments, generating the data user public key according to the identity identifier of the data user in the data sharing request, and generating the proxy re-encryption key based on the data user public key and the data owner private key includes: obtaining a corresponding proxy master key of the data owner and a corresponding proxy public parameter of the data owner; and generating the proxy re-encryption key based on the data user public key, the data owner private key, the corresponding proxy master key and the corresponding proxy public parameter.

In some embodiments, in response to receiving the request for obtaining shared data from the data user, obtaining the corresponding proxy re-encryption key and the corresponding encrypted data based on the request for obtaining shared data including: in response to receiving the request for obtaining shared data from a user, obtaining the corresponding encrypted data based on the request for obtaining shared data, and obtaining the corresponding proxy re-encryption key from the key management system by the data processing center; determining whether the user is the data user specified by the data owner of the shared data by the key management system; and in response to that the user is the data user specified by the data owner of the shared data, sending the corresponding proxy re-encryption key to the data processing center.

In some embodiments, bidirectional authentication is performed between any two of a client of the data owner, a client of the data user, the key management system and the data processing center through their respective security interfaces, and data is transmitted based on a software guard extension technology.

In some embodiments, the method for sharing the encrypted data further includes: updating the shared data by the data user, and regarding the updated data as new shared data and sharing the data based on a new data owner.

In a second aspect, an apparatus for sharing encrypted data is provided in the embodiments of the present disclosure, including: a first module configured for receiving a data sharing request sent by a data owner, and generating a data owner public key and a data owner private key according to an identity identifier of the data owner in the data sharing request; a second module configured for generating a data user public key according to an identity identifier of a data user in the data sharing request, and generating a proxy re-encryption key based on the data user public key and the data owner private key; a third module configured for encrypting shared data based on the data owner public key, and uploading encrypted data to a data processing center for storing; a fourth module configured for, in response to receiving a request for obtaining shared data from the data user, obtaining a corresponding proxy re-encryption key and corresponding encrypted data based on the request for obtaining shared data, and re-encrypting the encrypted data based on the proxy re-encryption key to obtain re-encrypted data; and a fifth module configured for obtaining a data user private key of the data user and decrypting the re-encrypted data based on the data user private key to obtain the shared data.

In a third aspect, a computer device is provided in the embodiments of the present disclosure, including: at least one processor; and a memory storing computer-readable instructions, when the computer-readable instructions are executed by the at least one processor, causing the at least one processor to implement the steps of the method according to any one of embodiments stated above.

In a fourth aspect, one or more non-volatile computer-readable storage media storing computer-readable instructions are provided in the embodiments of the present disclosure, when the computer-readable instructions are executed by one or more processors, causing the one or more processors to implement the steps of the method according to any one of embodiments stated above.

BRIEF DESCRIPTION OF THE DRAWINGS

In order to explain the embodiments of the present application or the technical solutions in the prior art more clearly, a brief description may be given below with reference to the accompanying drawings which are used in the description of the embodiments or the prior art, and it is obvious that the drawings in the description below are merely some embodiments of the present application, and a person skilled in the art may obtain other embodiments according to these drawings without involving any inventive effort.

DETAILED DESCRIPTION

In order to make the objective, technical solution and advantages of the present application clearer, the embodiments of the present application are further described in detail by combining the embodiments and referring the drawings.

It should be noted that all expressions using "first" and "second" in the embodiments of the present disclosure are intended to distinguish two different entities or parameters with the same name. It may be seen that "first" and "second" are merely for the convenience of expressions and should not be construed as limiting the embodiments of the present disclosure, which may not be stated one by one in subsequent embodiments.

Figure 1:
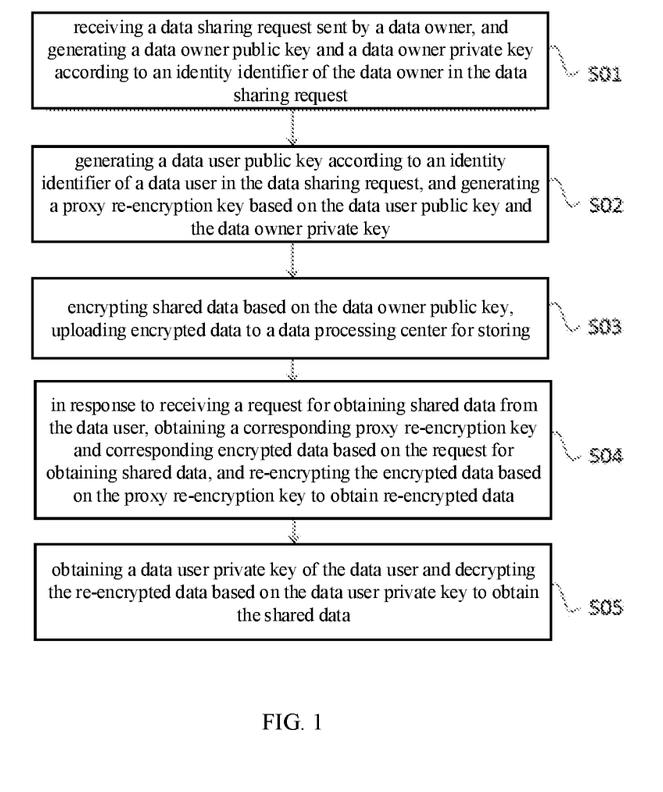
FIG. 1 is a schematic flow chart of the method for sharing the encrypted data according to one or more embodiments.

In a first aspect, a method for sharing encrypted data is provided in the embodiments of the present disclosure. FIG. 1 is a schematic diagram of an embodiment of the method for sharing the encrypted data. As shown in FIG. 1, the method for sharing the encrypted data may include steps as follows:

S01, receiving a data sharing request sent by a data owner, and generating a data owner public key and a data owner private key according to an identity identifier of the data owner in the data sharing request;

S02, generating a data user public key according to an identity identifier of a data user in the data sharing request, and generating a proxy re-encryption key based on the data user public key and the data owner private key;

S03, encrypting shared data based on the data owner public key, and uploading encrypted data to a data processing center for storing;

S04, in response to receiving a request for obtaining shared data from the data user, obtaining a corresponding proxy re-encryption key and corresponding encrypted data based on the request for obtaining shared data, and re-encrypting the encrypted data based on the proxy re-encryption key to obtain re-encrypted data; and S05, obtaining a data user private key of the data user and decrypting the re-encrypted data based on the data user private key to obtain the shared data.

Figure 2:
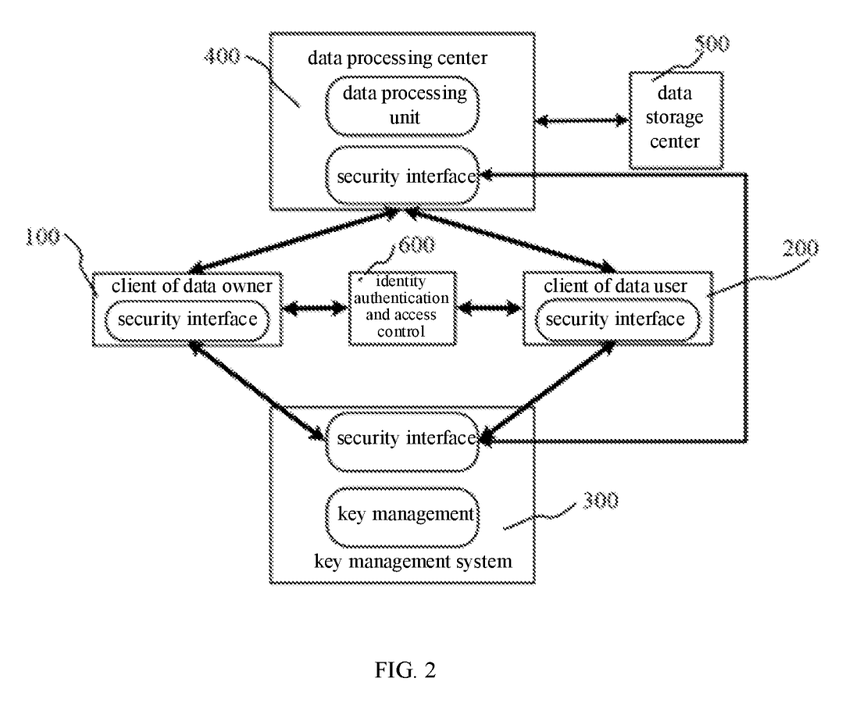
FIG. 2 is a schematic diagram of the system of the method for sharing the encrypted data according to one or more embodiments.

FIG. 2 shows a schematic diagram of the system of the embodiments of the method for sharing the encrypted data according to the present disclosure. As shown in FIG. 2, the embodiments of the method for sharing the encrypted data involve systems that may include the system a client of the data owner 100, a client of the data user 200, a key management system 300, a data processing center 400, a data storage center 500, an identity authentication and access control system 600. The keys in the key management system include symmetric keys, asymmetric keys, short secrets, certificates and other secrets. The key management system includes functions such as generation, storage, update, destruction of the key and realizing the generation of the proxy re-encryption key of the user. The key management system has the key generation function based on the identity identifier (identity ID) of the user. The key management system also includes secure data transmission channel function based on the software guard extensions (SGX). The key management system also includes an identity-based proxy re-encryption key generation module, a temporary storage module for the proxy re-encryption key, and a proxy re-encryption key destruction module.

In some embodiments, the method for sharing the encrypted data further includes executing steps in a key management system, the steps include: encrypting or decrypting at least one user key based on an item key, the user key including a data owner key and/or a data user key; encrypting or decrypting at least one proxy re-encryption key based on a shared item key; encrypting or decrypting at least one proxy master key and at least one corresponding proxy public parameter based on a parameter key; and encrypting or decrypting all of the item keys, all of the shared item keys and all of the parameter keys based on a system master key.

In the present embodiment, according to hierarchical management rules of the key management system, the system master key encrypts the item key, the shared item key and the parameter key. The item key encrypts the user key. The item key allows only users with access permissions to access according to an access strategy. The shared item key encrypts the proxy re-encryption key, wherein the item key allows all users with an access key management system to access. Therefore, the proxy re-encryption key is the shared part of the key management system. The parameter key encrypts the proxy master key and the proxy public key. The parameter key allows only users with the access permissions to access according to the access strategy. Since the IDs of the users are bound in authorization tokens, each user may only create his or her own private key. A plurality of item keys, a plurality of shared keys and a plurality of parameter keys may be encrypted according to different strategies in the key management system. A plurality of user keys may be encrypted under each item key. Each shared key item may create a plurality of proxy re-encryption keys. A plurality of proxy master keys and a plurality of proxy public parameters may be encrypted under each parameter key. In order to ensure the security of the data, each user may create the plurality of proxy master keys and the plurality of proxy public parameter according to different data, in this way, that the users have one public key and the plurality of different user private keys is ensured, different data may be encrypted to achieve security isolation between different data. Meanwhile, for the same encrypted data, the same proxy master key and proxy public parameter are used between the data owner and the data user to ensure the normal execution of the proxy re-encryption. The user keys of the data owner and data user may be encrypted with the same item key under the same item, and under different item keys, different item keys are used for encrypting.

In some embodiments, receiving the data sharing request sent by the data owner includes: receiving a login request of the data owner by a cloud computing system and performing identity authentication to the data owner based on the login request; in responding that the identity authentication of the data owner passes, allocating an authorization token to the data owner; and receiving the data sharing request of the data owner by the key management system.

In the present embodiment, the data owner first obtains the authorization token to access other services in the cloud computing system through the identity authentication and the identity authentication of access control services when logging into the cloud computing system. The data owner accesses the key management system. The security interfaces are used between the client of the data owner and the key management system to achieve bidirectional security authentication, and the credibility of the platforms on both sides is ensured, the session key is determined, and a secure transmission channel is established. The method that the security interfaces are used between the client of the data owner and the key management system to achieve the bidirectional security authentication includes: establishing a trusted transmission channel by using the public key certificates mutually known to each other on both sides, or achieving the bidirectional security authentication by using the SGX technology of the intel, and establishing a secure session key. The data owner uses the session key to send the access request to the key management system, and the key management system verifies the access permissions in the authorization token of the data owner through the access control strategy.

In some embodiments, generating the data owner public key and the data owner private key according to the identity identifier of the data owner in the data sharing request includes: determining whether the data owner creates a corresponding item key, when the data owner does not create the corresponding item key, creating the corresponding item key; determining whether the data owner creates a corresponding parameter key, when the data owner does not create the corresponding parameter key, and creating the corresponding parameter key; determining whether the data owner creates a corresponding proxy master key and a corresponding proxy public parameter, when the data owner does not create the corresponding proxy master key and the corresponding proxy public parameter, and creating the corresponding proxy master key and the corresponding proxy public parameter; creating the data owner public key based on the identity identifier of the data owner, and generating the data owner private key based on the data owner public key, the corresponding proxy master key and the corresponding proxy parameter; encrypting the data owner public key and the data owner private key based on the item key and storing in the key management system; encrypting the corresponding proxy master key and the corresponding proxy public parameter based on the parameter key, and storing in the key management system; and storing the system master key by the key management system, and encrypting the item key, the shared item key and the parameter key based on the system master key, and storing in the key management system.

In the present embodiment, the key management system extracts a creating data encryption key command in the access request of the data owner. As shown in FIG. 2, firstly, whether the item group where the data owner is located creates the item key is confirmed. If the item key does not exist, the key management system creates the item key. If the item key exists, whether the parameter key is created is confirmed. If not, the parameter key is created. Then whether the corresponding proxy master key and the corresponding proxy public parameter are created is confirmed. If not, the corresponding proxy master key and the corresponding proxy public parameter are created. Then the key management system creates the private key of the data owner based on the identity ID of the data owner and the proxy master key and the proxy public parameter. The public key is the ID of the data owner. The public key and the private key of the data owner are encrypted by using the item key as a pair of keys and stored in key management system. There is a corresponding relationship between the ID of the data owner and the private key and the proxy master key and the proxy public parameter.

In some embodiments, determining whether the data owner creates the corresponding item key, when the data owner does not create the corresponding item key, creating the corresponding item key includes: determining whether the data owner creates the corresponding item key, in response to that the data owner does not create the corresponding item key, creating the corresponding item key. Determining whether the data owner creates the corresponding parameter key, when the data owner does not create the corresponding parameter key, and creating the corresponding parameter key includes: determining whether the data owner creates the corresponding parameter key, in response to that the data owner does not create the corresponding parameter key, and creating the corresponding parameter key. Determining whether the data owner creates a corresponding proxy master key and a corresponding proxy public parameter, when the data owner does not create the corresponding proxy master key and the corresponding proxy public parameter, and creating the corresponding proxy master key and the corresponding proxy public parameter includes: determining whether the data owner creates a corresponding proxy master key and a corresponding proxy public parameter, in response to that the data owner does not create the corresponding proxy master key and the corresponding proxy public parameter, and creating the corresponding proxy master key and the corresponding proxy public parameter In some embodiments, generating the data user public key according to an identity identifier of the data user in the data sharing request, and generating the proxy re-encryption key based on the data user public key and the data owner private key includes: obtaining a corresponding proxy master key of the data owner and a corresponding proxy public parameter of the data owner; and generating the proxy re-encryption key based on the data user public key, the data owner private key, the corresponding proxy master key and the corresponding proxy public parameter.

In the present embodiment, the data owner needs to share the encrypted data, and the key management system extracts the set ID of the data user contained in the data owner request. The key management system creates a proxy re-encryption key based on the ID (public key) used by the data, the private key of the data owner, the proxy master key, and the proxy public parameter. At that moment, there is a corresponding relationship between the key of the data owner and the set ID of the data user, and the set ID of the data user is stored in the key management system as a part of the metadata of the key of the data owner.

In some embodiments, encrypting the shared data based on the data owner public key, uploading the encrypted data to the data processing center for storing includes: encrypting the shared data based on the data owner public key, wherein the signature verification of the encrypted data uses the mode of combining with Hash value and Hash-based message authentication code (HMAC) value to prevent data from being illegally tampered.

In the present embodiment, the key management system uses the session key to encrypt the key of data owner and sends the key to the security interface of the client of the data owner through the security interface. The data owner receives the key sent by the key management system through the security interface. The data owner encrypts the data by using the public key (identity ID) and the public parameters in the key. The data owner appends the information of the data owner to the encrypted data. The Hash value of the data calculated by the data owner is attached to the encrypted data. The data owner uses the private key as the Hash value of the encrypted data of the key of the message authentication code, and appends it to the encrypted data as the HMAC value. The stored data format is identity ID+encrypted data+Hash value+HMAC value. The data owner uploads the stored data to the data processing center. The data processing center sends the stored data to the storage center for data storage. The data storage center returns the storing-success message to the data processing center. The data processing center returns the storing-success message to the client.

In some embodiments, in response to receiving the request for obtaining shared data from the data user, obtaining the corresponding proxy re-encryption key and the corresponding encrypted data based on the request for obtaining shared data including: in response to receiving the request for obtaining shared data from a user, obtaining the corresponding encrypted data based on the request for obtaining shared data, and obtaining the corresponding proxy re-encryption key from the key management system by the data processing center; determining whether the user is the data user specified by the data owner of the shared data by the key management system; and when the user is the data user specified by the data owner of the shared data, sending the corresponding proxy re-encryption key to the data processing center.

In the present embodiment, the data user first obtains the authorization token to access other services in the cloud computing system through the identity authentication and the identity authentication of the access control services when logging into the cloud computing system. The data user requests the data processing center to share the encrypted data. The data processing center verifies the authorization token of the data user to ensure that the data user has the permission to access the data processing center. The data processing center sends an access request to the key management center for obtaining the proxy re-encryption key. The security interfaces are used between the data processing center and the key management system to achieve the bidirectional security authentication, the credibility of the platforms on both sides is ensured, the session key is determined, and a secure transmission channel is established. The method that the security interfaces are used between the data processing center and the key management system to achieve the bidirectional security authentication includes: establishing a trusted transmission channel by using the public key certificates mutually known to each other on both sides, or achieving the bidirectional security authentication by using the SGX technology of the intel, and establishing a secure session key.

In some embodiments, determining whether the user is the data user specified by the data owner of the shared data by the key management system; when the user is the data user specified by the data owner of the shared data, sending the corresponding proxy re-encryption key to the data processing center includes: determining whether the user is the data user specified by the data owner of the shared data by the key management system; and in response to that the user is the data user specified by the data owner of the shared data, sending the corresponding proxy re-encryption key to the data processing center.

The data processing center uses the session key to send the access request to the key management system. The key management system verifies the access permission in the authorization token of the data processing center through the access control strategy and ensures that the data processing center has the permission to access the key management system. The key management system reads the command for requesting to obtain the proxy re-encryption key in the access request of the data processing center. The key management system uses the system master key to decrypt the shared item key, the shared item key checks whether there is the proxy re-encryption key shared by the data owner to the data user under the encryption key of the shared item key. If the proxy re-encryption key does not exist, an error is reported and a message that the data user does not have the permission to use the shared data is returned to the data processing center. If the proxy re-encryption key exists, whether the data user in the key management system has a key is checked. This key has the same proxy master key and the proxy public parameter as the proxy re-encryption key. If the corresponding key does not exist, the private key corresponding to the data user is created based on the proxy master key and the proxy public parameter corresponding to the proxy re-encryption key and the public key (identity ID) of the data user. The public key and the private key are encrypted as a pair of keys by using the item keys and stored, respectively. The proxy re-encryption key is encrypted by using the session key and returns it to the data processing center through the security interface.

The data processing center obtains the encrypted data from the data storage center. The data storage center returns the encrypted data to the data processing center. The data processing center re-encrypts the data according to the proxy re-encryption key and the encrypted data to generate the data encrypted by the data user public key. The data processing center sends the re-encrypted data to the client of the data user. The re-encrypted data includes an identity ID of the data user, an identity ID of the data owner, the encrypted data and the Hash value of the data.

The data user requests the key to decrypt the shared encrypted data to the key management system. The data user accesses the key management system through the client. The security interfaces are used between the client of the data user and the key management system to achieve the bidirectional security authentication, the credibility of the platforms on both sides is ensured, the session key is determined, and a secure transmission channel is established. The method that the security interfaces are used between the client of the data user and the key management system to achieve the bidirectional security authentication includes: establishing a trusted transmission channel by using the public key certificates mutually known to each other on both sides, or achieving the bidirectional security authentication by using the SGX technology of the intel, and establishing a secure session key. The data user uses the session key to send the access request to the key management system, and the key management system verifies the access permission in the authorization token of the data user through the access control strategy, and ensures that the user has the permission to access the key management system. The key management system reads the command of requesting to use the encrypted key in the access request of the data user. The system master key of the key management system decrypts the item key, and the item key decrypts the corresponding key of the data user. The key management system encrypts the corresponding key of the data user through the session key and returns it to the client of the data user through the security interface.

In some embodiments, the data user receives the key sent by the key management system through the security interface. The data user decrypts the encrypted data by using the private key and the public parameters in the key. The data user obtains the plaintext of the data shared by the data owner.

In some embodiments, bidirectional authentication is performed between any two of a client of the data owner, a client of the data user, the key management system and the data processing center through their respective security interfaces, and data is transmitted based on a software guard extension technology.

In the present embodiment, the communication between the key management system, the data storage service and the client is generally considered to be unreliable, and the key transmitted between any two of the key management system, the data storage service and the client is threatened. Therefore, Intel develops a software extension guard instruction set (SGX technology) integrated into the CPU. The SGX technology is used to protect the security of the programs and the data of the user. Software developers may execute the application program code in a trusted computing environment enclave by using special instructions and the software in the SGX-enabled hardware systems. The enclave may provide an isolated trusted execution environment to protect the data of the application program from being snooped and tampered.

In some embodiments of the present disclosure, the method for sharing the encrypted data further including: updating the shared data by the data user and regarding the updated data as new shared data, and sharing the data based on a new data owner.

In the present embodiment, the data user may change the content of the data, recalculate the Hash value, use the private key of the data user to generate the HMAC value, and then concatenate into the storage data. The storage data is uploaded to the data processing center, and the data processing center stores the storage data in the data storage center. In this case, the encrypted data uploaded by the data user is different from the encrypted data of the original data owner.

In some embodiments, in order to extend the protecting scope and the scope of utility, a sharer identity ID set created according to the key management system may be changed to be a strategy matrix based on identity attributes. The strategy matrix is regarded as the access permission of the proxy re-encryption, at a same time, the strategy matrix is regarded as a part of component of the metadata of the proxy re-encryption key. As long as the data user passes the strategy matrix based on the identity data, the key management system may create the proxy re-encryption key and a pair of the corresponding public key and the corresponding private key for the data user, and save in the key management system.

In some embodiments, in order to facilitate the use of the whole system, sometimes the data user and the data owner belong to the same item team and have the same access permission. Therefore, in the key management system, identity-based keys may be directly created for common use by the data user and the data owner.

In some embodiments, when the shared data is too large, the shared data is encrypted symmetrically and the symmetric key is encrypted asymmetrically. Proxy re-encryption operation is performed on the symmetric key. The HAMC encryption herein is encrypted by using the private key of the owner. Therefore, data update, deletion and other operations in the data processing center need to verify that the original data is consistent with the HAMC value to operate. However, since the key of the HMAC is only owned by the data owner, therefore, only the data owner may update and delete the data in the cloud.

One or more embodiments stated above have one or more of the following advantages:
(1) The problem of sharing the encrypted data is realized by using the proxy re-encryption technology. The user key and the proxy re-encryption key are stored in the key management system. The key uses the SGX technology for data transmission between different services, which may greatly improve the security protection ability of the user data in the cloud computing environment.
(2) The key management system is used as the key generation and storage center, and the key is stored in the key management system. The user does not need to save the private key, which ensures the security of the key. At the same time, the system has identity authentication and access control components to ensure the security of the system.
(3) The SGX technology is used to establish a secure transmission interface at both ends of the key transmission to ensure that the key may be transmitted safely in an untrusted network environment.
(4) The key management system is used as the key generation and storage center. The key is stored in the key management system. The user does not need to save the private key by himself or herself, which ensures the security of the key. At the same time, there are identity authentication and access control components in the system to ensure the security of the system.
(5) The key function of the proxy re-encryption is integrated into the key management system to enrich its scope of use.

The signature verification of the encrypted data uses a mode of combining the Hash value with the HMAC value to prevent data from being illegally tampered.
(6) The storage mode of the key management system is reconstructed, and the shared item key and the parameter key are added to make the key management system more flexible and convenient.
(7) The key construction method based on the identity ID does not need to use the public key certificate and generate the user public key separately.

In particular, it should be noted that the steps in the method for sharing the encrypted data stated above may be mutually crossed, replaced, added and deleted. Therefore, these reasonable permutation and combination transformations should also belong to the protection scope of the present disclosure, and the protection scope of the present disclosure should not be limited to the embodiment.

Figure 3:
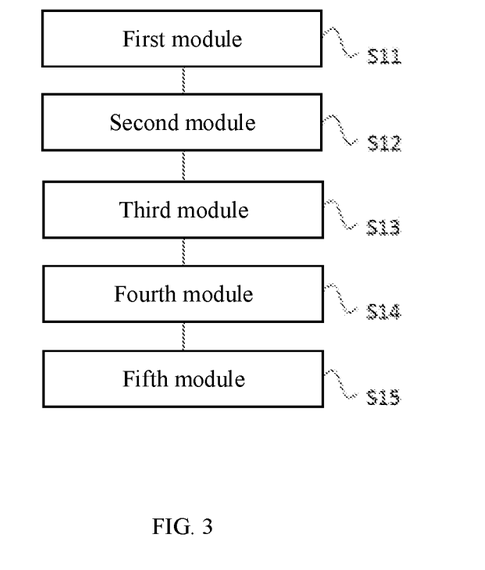
FIG. 3 is a schematic diagram of the apparatus for sharing the encrypted data according to one or more embodiments.

In a second aspect, an apparatus for sharing encrypted data is provided in the embodiments of the present disclosure. FIG. 3 shows a schematic diagram of the apparatus for sharing the encrypted data provided the present disclosure. As shown in FIG. 3, the apparatus for sharing the encrypted data includes modules as follows: a first module S11 configured for receiving a data sharing request sent by a data owner, and generating a data owner public key and a data owner private key according to an identity identifier of the data owner in the data sharing request; a second module S12 configured for generating a data user public key according to an identity identifier of a data user in the data sharing request, and generating a proxy re-encryption key based on the data user public key and the data owner private key; a third module S13 configured for encrypting shared data based on the data owner public key, uploading encrypted data to a data processing center for storing; a fourth module S14 configured for, in response to receiving a request for obtaining shared data from the data user, obtaining a corresponding proxy re-encryption key and corresponding encrypted data based on the request for obtaining shared data, and re-encrypting the encrypted data based on the proxy re-encryption key to obtain re-encrypted data; and a fifth module S15 configured for obtaining a data user private key of the data user and decrypting the re-encrypted data based on the data user private key to obtain the shared data.

Figure 4:
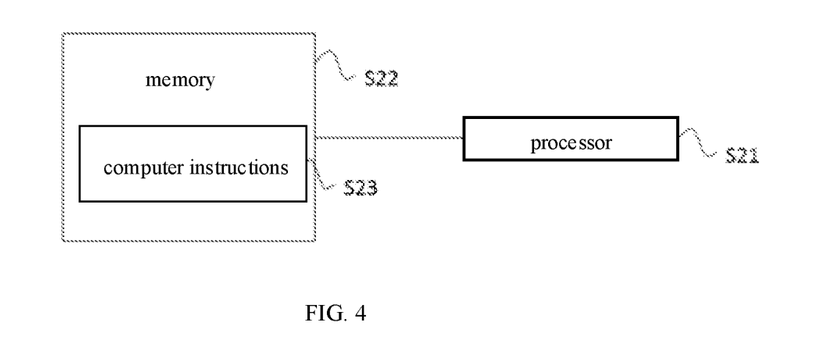
FIG. 4 is a schematic diagram of the computer device according to one or more embodiments.

In a third aspect, a computer device is provided in the embodiments of the present disclosure. FIG. 4 shows a schematic diagram of the embodiments of computer device provided in the present disclosure. As shown in FIG. 4, the computer device including devices as follows: at least one processor S21; and a memory S22 storing computer-readable instructions S23, when the computer-readable instructions S23 are executed by the at least one processor S21, causing the at least one processor S21 to implement the steps of the method according to any one of embodiments stated above.

Figure 5:
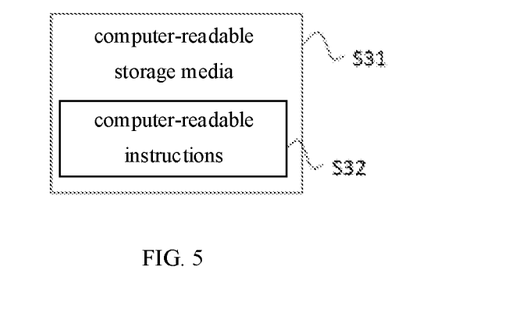
FIG. 5 is a schematic diagram of the computer-readable storage medium according to one or more embodiments.

In a fourth aspect, as shown in FIG. 5, one or more non-volatile computer-readable storage media S31 storing computer-readable instructions S32 are provided in the embodiments of the present disclosure, when the computer-readable instructions S32 are executed by one or more processors, causing the one or more processors to implement the steps of the method according to any one of embodiments stated above.

It should be noted that a person skilled in the art may understand all or a part of the process of implementing the method in the embodiment above, which may be completed by using computer-readable instructions to instruct related hardware. The computer-readable instructions of the method for sharing the encrypted data may be stored in a computer-readable storage medium. When the computer-readable instructions are executed, the steps of the method for sharing the encrypted data of any embodiment stated above may be realized. Wherein the computer-readable storage media may be disk, disc, read-only memory (ROM) or random memory (RAM). The above embodiments of the computer-readable instructions may achieve the same or similar effects as any one of the corresponding method embodiments.

In addition, the method for sharing the encrypted data disclosed in the embodiments of the present disclosure may also be implemented as a computer-readable instruction executed by a processor that may be stored in a non-volatile computer-readable storage medium. When the computer-readable instruction is executed by the processor, the functions that may be realized in the encrypted data sharing method disclosed by any embodiment of the present disclosure are realized.

In addition, the above method steps and system units may also be implemented by using the controller and a non-volatile computer-readable storage medium for storing computer-readable instructions that enable the controller to perform the above steps or unit functions.

A person skilled in the art may also understand that various example logic blocks, modules, circuits, and algorithm steps described here may be implemented as electronic hardware, computer software, or a combination of both of the electronic hardware and the computer software. In order to clearly illustrate this interchangeability of hardware and software, a general description of the functions of various schematic components, blocks, modules, circuits and steps has been given. Whether this function is implemented as software or hardware depends on the application and the design constraints applied to the entire system. A person skilled in the art may implement functions in various ways for each application, but this implementation decision should not be interpreted as leading to a departure from the scope of the disclosure of the embodiments of the present application.

In one or more exemplary designs, functionality may be implemented in a hardware, a software, a firmware, or any combination of them. If implemented in the software, the function may be stored as one or more instructions or code on or transmitted through the computer-readable medium. The computer-readable medium includes computer storage medium and communication medium. The communication medium includes any medium that helps to transmit computer programs from one location to another. A storage medium may be any available medium that may be accessed by a general or dedicated computer. As an example rather than restrictive, the computer-readable medium may include RAM, ROM, EEPROM, CD-ROM or other optical disk storage devices, disk storage devices or other magnetic storage devices, or may be used to carry or store the required program code in the form of instructions or data structures and may be any other medium accessed by general or special computers or general or special processors. In addition, any connection may be appropriately called a computer-readable medium. For example, if coaxial cable, fiber cable, twisted pair, digital subscriber line (DSL) or wireless technologies such as infrared, radio and microwave are used to send software from websites, servers or other remote sources, the above coaxial cable, fiber cable, twisted pair, DSL or wireless technologies such as infrared, radio and microwave are included in the definition of the medium. As used here, disks and optical disks include compressed discs (CDs), laser discs, optical disks, digital multi-function discs (DVDs), floppy disks, and blue discs, where disks typically magnetically reproduce data, while optical disks use laser to optically reproduce data. The combination of the above contents should also be included in the range of computer-readable media.

The above is an exemplary embodiment of the present disclosure, but it should be noted that various changes and modifications may be made without deviating from the scope disclosed by the embodiments of present disclosure, which is limited by the claim. The functions, steps and/or actions of the method claims according to the embodiment disclosed described here do not need to be performed in any particular order. In addition, although the elements disclosed in the embodiments of the present application may be described or required in an individual form, they can be understood as multiple unless explicitly limited to singular.

It should be understood that, as used herein, unless the context clearly supports an exception, the singular form "a" is intended to encompass a plural form. It should also be understood that, as used herein, the "and/or" refers to including any and all feasible combinations of one or more relatively listed items.

The serial numbers of the embodiments of the present application are merely for the purpose of description, and do not indicate the relative preferences of the embodiments.

It may be appreciated by persons of ordinary skill in the art that all or part of the steps for implementing the above embodiments may be completed by hardware, or may be completed by instructing relevant hardware through a program. The program may be stored in a computer-readable storage medium, which may be a read-only memory, a magnetic disk or a compact disk, etc.

A person skilled in the art should understand that the discussion on any of the above embodiments is merely illustrative, and are not intended to imply that the scope (including the claims) of the embodiments of the present application is limited to those examples. With the concept of the embodiments of the present application, the embodiments or the technical features of different embodiments may be combined, and many other variations of different aspects of the embodiments of the present application as stated above may exist, which are not provided in detail for brevity. Therefore, any omissions, modifications, equivalent substitutions and improvements that are made within the spirit and the principle of the embodiments of the present application should fall within the protection scope of the embodiments of the present application.

The invention claimed is:
1. A method for sharing encrypted data, comprising:
receiving a data sharing request sent by a data owner, and generating a data owner public key and a data owner private key according to an identity identifier of the data owner in the data sharing request;

generating a data user public key according to an identity identifier of a data user in the data sharing request, and generating a proxy re-encryption key based on the data user public key and the data owner private key;

encrypting shared data based on the data owner public key, and uploading the encrypted data to a data processing center for storing;

in response to receiving a request for obtaining shared data from the data user, obtaining a corresponding proxy re-encryption key and corresponding encrypted data based on the request for obtaining shared data, and re-encrypting the corresponding encrypted data based on the corresponding proxy re-encryption key to obtain re-encrypted data; and obtaining a data user private key of the data user and decrypting the re-encrypted data based on the data user private key to obtain the shared data.

2. The method for sharing the encrypted data according to claim 1, wherein the method further comprises executing steps in a key management system, the steps comprise:

encrypting or decrypting at least one user key based on an item key, the user key comprising a data owner key and/or a data user key;

encrypting or decrypting at least one proxy re-encryption key based on a shared item key;

encrypting or decrypting at least one proxy master key and at least one corresponding proxy public parameter based on a parameter key; and encrypting or decrypting all of the item keys, all of the shared item keys and all of the parameter keys based on a system master key.

3. The method for sharing the encrypted data according to claim 2, wherein generating the data owner public key and the data owner private key according to the identity identifier of the data owner in the data sharing request comprises:

determining whether the data owner creates a corresponding item key, in response to that the data owner does not create the corresponding item key, creating the corresponding item key;

determining whether the data owner creates a corresponding parameter key, in response to that the data owner does not create the corresponding parameter key, creating the corresponding parameter key;

determining whether the data owner creates a corresponding proxy master key and a corresponding proxy public parameter, in response to that the data owner does not create the corresponding proxy master key and the corresponding proxy public parameter, creating the corresponding proxy master key and the corresponding proxy public parameter;

creating the data owner public key based on the identity identifier of the data owner, and generating the data owner private key based on the data owner public key, the corresponding proxy master key and the corresponding proxy parameter;

encrypting the data owner public key and the data owner private key based on the item key and storing in the key management system;

encrypting the corresponding proxy master key and the corresponding proxy public parameter based on the parameter key, and storing in the key management system; and storing the system master key by the key management system, and encrypting the item key, the shared item key and the parameter key based on the system master key, and storing in the key management system.

4. The method for sharing the encrypted data according to claim 2, wherein generating the data owner public key and the data owner private key according to the identity identifier of the data owner in the data sharing request comprises:

determining whether the data owner creates a corresponding item key, in response to that the corresponding item key is created, determining whether the data owner creates a corresponding parameter key, in response to that the data owner does not create the corresponding parameter key, creating the corresponding parameter key;

determining whether the data owner creates a corresponding proxy master key and a corresponding proxy public parameter, in response to that the data owner does not create the corresponding proxy master key and the corresponding proxy public parameter, creating the corresponding proxy master key and the corresponding proxy public parameter;

creating the data owner public key based on the identity identifier of the data owner, and generating the data owner private key based on the data owner public key, the corresponding proxy master key and the corresponding proxy public parameter;

encrypting the data owner public key and the data owner private key based on the item key and storing in the key management system;

encrypting the corresponding proxy master key and the corresponding proxy public parameter based on the parameter key and storing in the key management system; and storing the system master key by the key management system, and encrypting the item key, the shared item key and the parameter key based on the system master key, and storing in the key management system.

5. The method for sharing the encrypted data according to claim 2, wherein bidirectional authentication is performed between any two of a client of the data owner, a client of the data user, the key management system and the data processing center through their respective security interfaces, and data is transmitted based on a software guard extension technology.

6. The method for sharing the encrypted data according to claim 1, wherein receiving the data sharing request sent by the data owner comprises:

receiving a login request of the data owner by a cloud computing system and performing identity authentication to the data owner based on the login request;

in responding that identity authentication of the data owner passes, allocating an authorization token to the data owner; and receiving the data sharing request of the data owner by the key management system.

7. The method for sharing the encrypted data according to claim 1, wherein generating the data user public key according to the identity identifier of the data user in the data sharing request, and generating the proxy re-encryption key based on the data user public key and the data owner private key comprises:

obtaining a corresponding proxy master key of the data owner and a corresponding proxy public parameter of the data owner; and generating the proxy re-encryption key based on the data user public key, the data owner private key, the corresponding proxy master key and the corresponding proxy public parameter.

8. The method for sharing the encrypted data according to claim 1, wherein in response to receiving the request for obtaining shared data from the data user, obtaining the corresponding proxy re-encryption key and the corresponding encrypted data based on the request for obtaining shared data comprises:

in response to receiving the request for obtaining shared data from a user, obtaining the corresponding encrypted data based on the request for obtaining shared data, and obtaining the corresponding proxy re-encryption key from the key management system by the data processing center;

determining whether the user is the data user specified by the data owner of the shared data by the key management system; and in response to that the user is the data user specified by the data owner of the shared data, sending the corresponding proxy re-encryption key to the data processing center.

9. A computer device, comprising:

at least one processor; and a memory storing computer-readable instructions, when the computer-readable instructions are executed by the at least one processor, causing the at least one processor to implement the steps of the method according to claim 1.

10. The computer device according to claim 9, wherein the method further comprises executing steps in a key management system, the steps comprise:

encrypting or decrypting at least one user key based on an item key, the user key comprising a data owner key and/or a data user key;

encrypting or decrypting at least one proxy re-encryption key based on a shared item key;

encrypting or decrypting at least one proxy master key and at least one corresponding proxy public parameter based on a parameter key; and encrypting or decrypting all of the item keys, all of the shared item keys and all of the parameter keys based on a system master key.

11. The computer device according to claim 10, wherein generating the data owner public key and the data owner private key according to the identity identifier of the data owner in the data sharing request comprises:

determining whether the data owner creates a corresponding item key, in response to that the data owner does not create the corresponding item key, creating the corresponding item key;

determining whether the data owner creates a corresponding parameter key, in response to that the data owner does not create the corresponding parameter key, creating the corresponding parameter key;

determining whether the data owner creates a corresponding proxy master key and a corresponding proxy public parameter, in response to that the data owner does not create the corresponding proxy master key and the corresponding proxy public parameter, creating the corresponding proxy master key and the corresponding proxy public parameter;

creating the data owner public key based on the identity identifier of the data owner, and generating the data owner private key based on the data owner public key, the corresponding proxy master key and the corresponding proxy parameter;

encrypting the data owner public key and the data owner private key based on the item key and storing in the key management system;

encrypting the corresponding proxy master key and the corresponding proxy public parameter based on the parameter key, and storing in the key management system; and storing the system master key by the key management system, and encrypting the item key, the shared item key and the parameter key based on the system master key, and storing in the key management system.

12. The computer device according to claim 10, wherein generating the data owner public key and the data owner private key according to the identity identifier of the data owner in the data sharing request comprises:

determining whether the data owner creates a corresponding item key, in response to that the corresponding item key is created, determining whether the data owner creates a corresponding parameter key, in response to that the data owner does not create the corresponding parameter key, creating the corresponding parameter key;

determining whether the data owner creates a corresponding proxy master key and a corresponding proxy public parameter, in response to that the data owner does not create the corresponding proxy master key and the corresponding proxy public parameter, creating the corresponding proxy master key and the corresponding proxy public parameter;

creating the data owner public key based on the identity identifier of the data owner, and generating the data owner private key based on the data owner public key, the corresponding proxy master key and the corresponding proxy public parameter;

encrypting the data owner public key and the data owner private key based on the item key and storing in the key management system;

encrypting the corresponding proxy master key and the corresponding proxy public parameter based on the parameter key and storing in the key management system; and storing the system master key by the key management system, and encrypting the item key, the shared item key and the parameter key based on the system master key, and storing in the key management system.

13. The computer device according to claim 9, wherein receiving the data sharing request sent by the data owner comprises:

receiving a login request of the data owner by a cloud computing system and performing identity authentication to the data owner based on the login request;

in responding that identity authentication of the data owner passes, allocating an authorization token to the data owner; and receiving the data sharing request of the data owner by the key management system.

14. The computer device according to claim 9, wherein generating the data user public key according to the identity identifier of the data user in the data sharing request, and generating the proxy re-encryption key based on the data user public key and the data owner private key comprises:

obtaining a corresponding proxy master key of the data owner and a corresponding proxy public parameter of the data owner; and generating the proxy re-encryption key based on the data user public key, the data owner private key, the corresponding proxy master key and the corresponding proxy public parameter.

15. One or more non-transitory computer-readable storage media storing computer-readable instructions, wherein when the computer-readable instructions are executed by one or more processors, causing the one or more processors to implement the steps of the method according to claim 1.

16. The method for sharing the encrypted data according to claim 1, wherein the re-encrypted data comprises the identity identifier of the data user, the identity identifier of the data owner, the encrypted data and Hash value of data.

17. The method for sharing the encrypted data according to claim 1, wherein the data user receives the key sent by the key management system through the security interface, and the data user decrypts the encrypted data by using the private key and the public parameters in the key, and then the data user obtains a plaintext of data shared by the data owner.

18. The method for sharing the encrypted data according to claim 1, after obtaining the shared data, the method further comprises: updating the shared data by the data user, and regarding the updated data as new shared data and sharing the new shared data based on a new data owner.

19. A system for sharing encrypted data, comprising: a client of a data owner, a client of a data user, a key management system, a data processing unit, a data storage center and an identity authentication and access control system, wherein the key management system is configured for implementing the steps of the method according to claim 1.

20. The system for sharing the encrypted data according to claim 19, wherein the data processing center comprises a first security interface, the key management system comprises a second security interface, the client of data owner comprises a third security interface and the client of data user comprises a fourth security interface;

wherein the first security interface is communicatively connected to the third security interface and the fourth security interface, respectively; the second security interface is communicatively connected to the third security interface and the fourth security interface, respectively; and the second security interface is communicatively connected to the first security interface.

* * * * *